US012802665B2

(12) United States Patent
Koivurova et al.

(10) Patent No.: US 12,802,665 B2
(45) Date of Patent: Nov. 17, 2026

(54) NECK FOR A MUSICAL INSTRUMENT AND A METHOD FOR MANUFACTURING A FRETBOARD FOR A NECK FOR A MUSICAL INSTRUMENT

(71) Applicant: Flaxwood Oy, Uusi-Värtsilä (FI)

(72) Inventors: Heikki Koivurova, Uusi-Värtsilä (FI); Mika Räty, Uusi-Värtsilä (FI); Roderick Welch, Uusi-Värtsilä (FI)

(73) Assignee: Flaxwood Oy, Uusi-Värtsila (FI)

( * ) Notice: Subject to any disclaimer, the term of this patent is extended or adjusted under 35 U.S.C. 154(b) by 290 days.

(21) Appl. No.: 18/631,788

(22) Filed: Apr. 10, 2024

(65) Prior Publication Data

US 2024/0347025 A1 Oct. 17, 2024

(30) Foreign Application Priority Data

Apr. 12, 2023 (FI) ..................................... 20235414

(51) Int. Cl.
*G10D 3/06* (2020.01)
*G10D 1/08* (2006.01)
*G10D 3/22* (2020.01)

(52) U.S. Cl.
CPC ............... *G10D 3/06* (2013.01); *G10D 1/085* (2013.01); *G10D 3/22* (2020.02)

(58) Field of Classification Search
CPC ............ G10D 3/06; G10D 1/085; G10D 3/22; G10D 1/05; B29C 45/0005
See application file for complete search history.

(56) References Cited

U.S. PATENT DOCUMENTS 4,290,336 A 9/1981 Peavey
4,633,754 A 1/1987 Chapman
(Continued)

FOREIGN PATENT DOCUMENTS

JP 62-57294 4/1987
JP 02-73295 3/1990
(Continued)

OTHER PUBLICATIONS

May 27, 2025 Notice of Allowance issued in Japanese Patent Application No. 2024-063224, pp. 1-3 [machine translation included].
(Continued)

*Primary Examiner* — Kimberly R Lockett
(74) *Attorney, Agent, or Firm* — NIXON & VANDERHYE, PC

(57) ABSTRACT

The invention relates to a neck (1) for a musical instrument, the neck (1) comprising: a neck body (10); a fretboard (20) attached to the neck body (10), such that the neck body (10) and the fretboard (20) delimit a space (40), the fretboard (20) comprising a plurality of lateral fret slots (21) on a first side (20*a*) of the fretboard (20); and elongated support bars (30) arranged between the neck body (10) and the fretboard (20), the support bars (30) are oriented to run in a longitudinal direction of the neck of the musical instrument (1). The fretboard (20) comprising a plurality of lateral reinforcing tabs (22) on a second side (20*b*) of the fretboard (20) such that the reinforcing tabs (22) are located below the fret slots (21). The invention also relates to a method for manufacturing a fretboard (20) for a neck (1) of a musical instrument.

17 Claims, 4 Drawing Sheets

(56) References Cited

U.S. PATENT DOCUMENTS

| | | | | |
|---|---|---|---|---|
| 5,072,643 | A | 12/1991 | Murata | |
| 5,990,396 | A * | 11/1999 | Lasner | G10D 3/22 84/293 |
| 7,427,707 | B2 | 9/2008 | Shaffer | |
| 7,531,729 | B1 | 5/2009 | Davis et al. | |
| 7,579,533 | B2 | 8/2009 | Jones | |
| 10,984,762 | B2 * | 4/2021 | Kudirka | G10D 1/08 |
| 2006/0032358 | A1 | 2/2006 | Rautia | |
| 2006/0101980 | A1 | 5/2006 | Jones | |
| 2009/0183618 | A1 | 7/2009 | Luttwak | |
| 2019/0333483 | A1 | 10/2019 | Giger et al. | |

FOREIGN PATENT DOCUMENTS

| | | |
|---|---|---|
| JP | 02-62600 | 5/1990 |
| JP | 2000-066661 | 3/2000 |
| JP | 2020-504323 | 2/2020 |

OTHER PUBLICATIONS

Aug. 23, 2024 Search Report issued in European Patent Application No. 24169431.4, pp. 1-9.

Finnish Search Report for FI 20235414, dated Nov. 17, 2023, 2 pages.

* cited by examiner

NECK FOR A MUSICAL INSTRUMENT AND A METHOD FOR MANUFACTURING A FRETBOARD FOR A NECK FOR A MUSICAL INSTRUMENT

CROSS-REFERENCE TO RELATED APPLICATIONS

This application claims priority to Finnish Patent Application No. 20235414, filed Apr. 12, 2023, the entire contents of each of which are hereby incorporated by reference.

BACKGROUND OF THE INVENTION

Field of the Invention

This invention relates to a neck for a musical instrument, particularly a musical string instrument, and to a method for manufacturing a fretboard for a neck of a musical instrument.

Description of Prior Art

Musical instruments are high precision instruments that need to produce a certain sound quality to be qualified for use. Particularly, the construction of necks of musical string instruments plays a major part in making up the sound of the instrument. The neck connects the body of the instrument where one end of the strings is anchored, to the headstock of the instrument where the second end of the strings is anchored. The distance between said anchor points regulates the sounding length of the string. When the string is pressed against the neck, a new anchor point is created dividing the string into two vibrating parts and thus effectively changing the sounding length of the string. Most necks have frets in order to aid the user to determine correct finger positions for the correct notes. The frets make it easier for a player to achieve an acceptable standard of intonation while playing the instrument, thus affecting the playability of the instrument. The positioning of the frets is crucial in achieving the correct tone, and the position must be within 0.05 mm of the correct position, or the instrument is rendered unusable.

Most often the necks of musical string instruments such as violins and guitars, are solid necks made of wood. Wood is an excellent material in terms of sound engineering because wood is extremely stiff material in respect of its weight, and its vibrating properties generally please the human ear. The length of tone is suitably short while wood suitably dampens the vibration. However, there are significant disadvantages with the known wooden necks. Wood is laborious and relatively slow to work with to achieve the exact shape and degree of finishing (for example desired coarseness of the surface) required. Particularly, forming the fret slots on wooden necks requires that the fret slots must first be sawed in exact positions and then be finished with special files to achieve a satisfactory end result. These precise results are difficult to achieve with wood due to humidity and temperature related expansion and shrinkage. In addition, no matter how thoroughly the manufacturing is done, inconvenient influence of pores, possible resin pockets, ingrain structure, and other invisible unevenness on the surface of wood often appear only while testing the finished instrument.

The problems with wooden necks have been tried to be solved with polymers mimicking wood. However, in known solutions the necks still require same manufacturing steps where the fret slots are sawed and finished before the frets can be applied. Use of plastics poses a further problem as the matrix plastics used in natural fiber composites are inclined to fracturing, i.e. that the microfractures created in the sawing process keep developing over time, resulting in the neck breaking eventually. This flaw is particularly awkward, as the product is already purchased by the user when the breaking occurs, and the flaw is difficult to notice in quality control beforehand.

Sawing of the fret slots also poses a serious health threat as in the wood types used in fretboards, the sawdust is carcinogenic and may cause asbestosis if inhaled. Therefore, expensive protective gear such as respirators and high-power vacuums must be used in the workstation, thus increasing the costs of the production. Similarly, also sawing of polymers poses a health risk as polymers are prone to melting caused by friction, which in turn may cause the neck to jam the saw, sending the neck flying across the room and potentially seriously harming the workers.

Therefore, there exists a clear need for an improved neck for a musical string instrument. Also, manufacturing processes of necks for musical instruments are lacking in many aspects.

SUMMARY OF THE INVENTION

An object of the present invention is to solve the above-mentioned disadvantages and to provide a neck for a musical instrument which has excellent properties during use and is easy to manufacture reliably. These and other objects are achieved with a neck according to independent claim 1 and with a manufacturing method according to independent claim 12.

Preferred embodiments of the invention are disclosed in the dependent claims.

Further advantages and details of the invention are disclosed in detail in the description below.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1A:
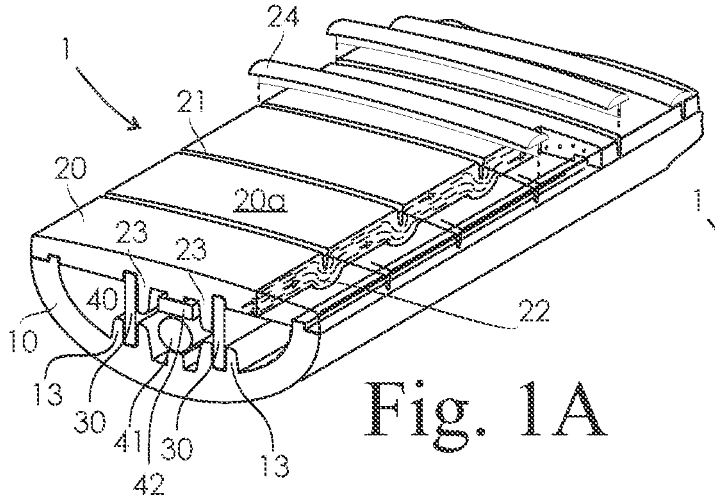
FIG. 1A illustrates a perspective view of a section of a first embodiment of the invention.

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. All combinations of the embodiments are considered possible if their combination does not lead to structural or logical contradiction.

FIGS. 1A to 3B illustrate embodiments of a neck 1 for a musical instrument. The neck 1 comprising: a neck body 10; a fretboard 20 attached to the neck body 10, such that the neck body 10 and the fretboard 20 delimit a space 40, the fretboard 20 comprising a plurality of lateral fret slots 21 on a first side 20*a* of the fretboard 20; and elongated support bars 30 arranged between the neck body 10 and the fretboard 20, the support bars 30 are oriented to run in a longitudinal direction of the neck of the musical instrument 1. The fretboard 20 further comprises a plurality of lateral reinforcing tabs 22 on a second side 20*b* of the fretboard 20 such that the reinforcing tabs 22 are located below the fret slots 21. This hollow configuration enables a lighter neck 1 construction without weakening the structural integrity of the neck 1 and longevity of the instrument. The hollow construction also acts as a resonator for the string vibrations thus amplifying the sound of the instrument. A lighter neck 1 also facilitates handling of the instrument making the instrument easier to maneuver while playing.

The primary function of the elongated support bars 30 is to strengthen and reinforce the neck by increasing its rigidity. This is advantageous as the neck 1 must be strong enough to withstand use and strong enough to withstand the forces exerted by the tension of the strings. A secondary function of the elongated support bars 30 is to transfer string vibrations from the headstock and the frets to the body of the guitar.

The lateral reinforcing tabs 22 reinforce the fretboard in regions of the fret slots 21, where the material thickness is reduced due to formation of fret slots 21. This allows the construction of the neck 1 to be hollow, without weakening the fretboard 20 too much, or adding unnecessary material to the neck 1.

The combination of the elongated support bars 30 and lateral reinforcing tabs 22 functions as a miniature soundpost under the frets. When the string is stopped on a particular fret, in effect there is a transfer of vibrations from the fret (stopped string) to the body of the neck, and along the elongated support bars 30, which preferably extends to the body of the instrument. This transfer of resonant vibrations from the neck to the body of the instrument, increases the resonant response of the body, which in turn enhances sustain and tonal color of the sound of the instrument.

The neck 1 may also further comprise a dual action trussrod 41, 42 directly below the fretboard 20 as illustrated in embodiments of FIGS. 1A to 3B. The dual action trussrod 41, 42 can be made from steel or titanium, for instance, and is used to create a small amount of longitudinal relief to the surface of the fretboard 20 to counteract the tension of the strings and fine tune the height of the strings above the fretboard 20.

Figure 5:
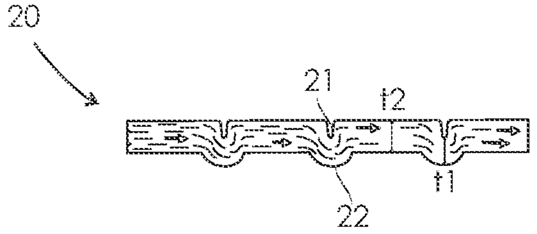
FIG. 5 illustrates a cross-sectional side view of an embodiment of a fretboard.

In the embodiments of FIGS. 1A to 3B, as illustrated in FIG. 5, the lateral reinforcing tabs 22 are formed such that a thickness t1 of the fretboard 20 in regions of the lateral reinforcing tabs 22 is at least the thickness t2 of the fretboard 20 outside of said regions. This dimensioning ensures that the fretboard 20 is not weakened in the regions of the fret slots 21, and thus improves durability of the fretboard 20 and consequently durability of the neck 1.

In the embodiments of FIGS. 1A to 3B, the fretboard 20 comprises the lateral reinforcing tabs 22 on the second side 20*b* of the fretboard 20 in regions, that are not directly supported by other structures of the neck. In other words, the areas of the fretboard which are in direct contact with the neck body 10 and/or the elongated support bars 30, do not comprise lateral reinforcing tabs 22. This facilitates particularly assembly of the neck 1 by simplifying the joining geometry of the components. This does not significantly weaken the neck 1 as the effective combined material thickness of the neck 1 supports the fretboard in these areas.

In the embodiment of FIGS. 2A to 3B, the elongated support bars 30 are formed as integral parts of the neck body 10 and/or the fretboard 20. This configuration simplifies assembly and construction of the neck 1.

Figure 1B:
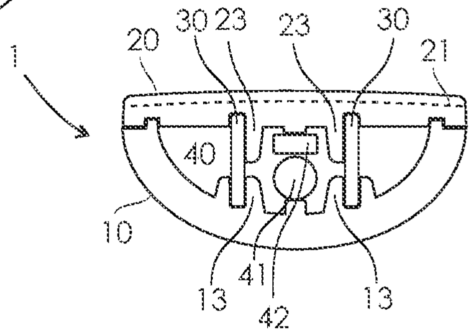
FIG. 1B illustrates a cross section of FIG. 1A.
Figure 2A:
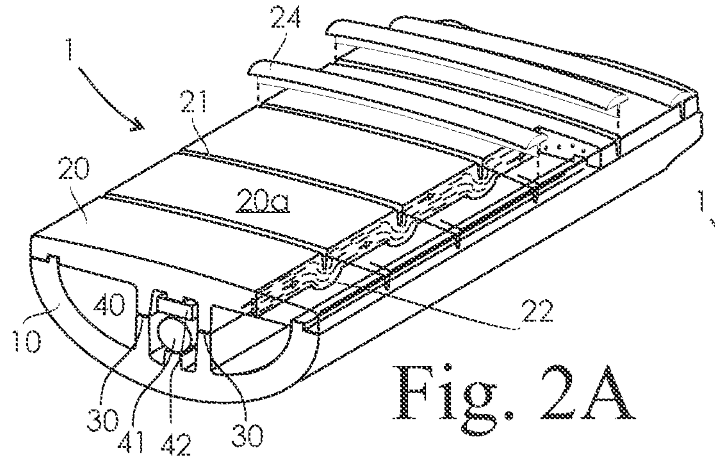
FIG. 2A illustrates a perspective view of a section of a second embodiment of the invention.
Figure 2B:
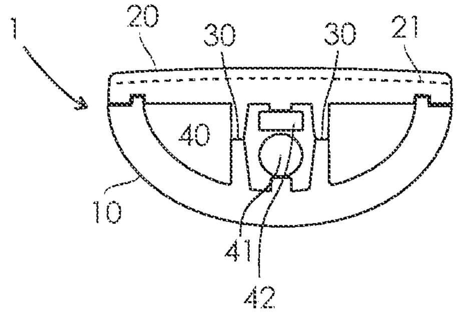
FIG. 2B illustrates a cross section of FIG. 2A.
Figure 3A:
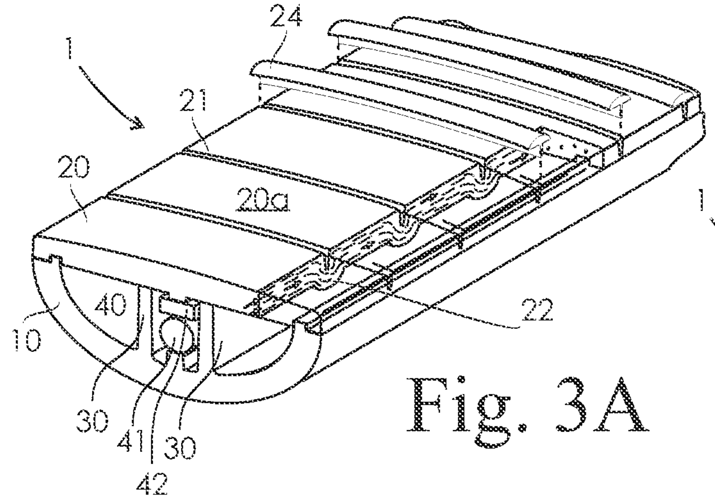
FIG. 3A illustrates a perspective view of a section of a third embodiment of the invention.
Figure 3B:
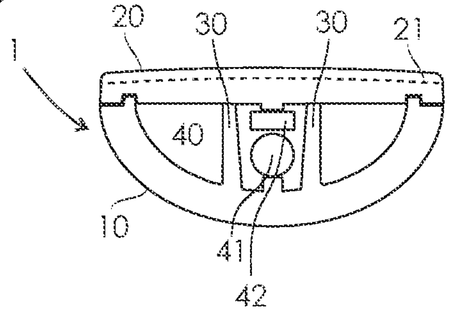
FIG. 3B illustrates a cross section of FIG. 3A.
Figure 4:
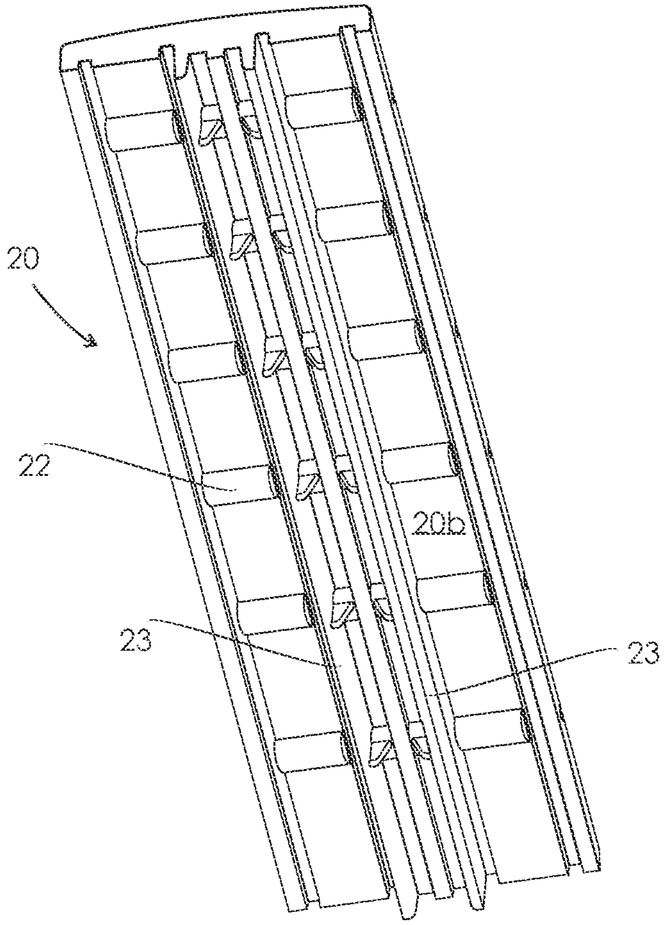
FIG. 4 illustrates a perspective view of an embodiment of a fretboard.

In the embodiment of FIGS. 1A and 1B, the elongated support bars 30 are formed as separate parts from the neck body 10 and the fretboard 20. This enables different materials to be used in the elongated support bars 30, and thus provides improved possibilities for adjusting the properties of the neck 1.

In the embodiment of FIGS. 1A and 1B, the neck body 10 comprises first positioning elements 13 arranged in the longitudinal direction of the neck of the musical instrument 1, the first positioning elements 13 forming a seat for the elongated support bars 30 in the neck body 10. The first positioning elements 13 increase the contact area between the neck body 10 and the elongated support bars 30 thus resulting in improved adhesion when the neck 1 is assembled. The first positioning elements 13 also facilitate positioning of the components making the assembly of the neck 1 easier.

In the embodiment of FIGS. 1A and 1B, the fretboard 20 further comprises second positioning elements 23 on the second side 20*b* of the fretboard 20 arranged in the longitudinal direction of the fretboard 20, the second positioning elements 23 forming a seat for the support bars 30 in the fretboard 20. The second positioning elements 23 increase the contact area between the fretboard 20 and the elongated support bars 30 thus resulting in improved adhesion when the neck 1 is assembled. The second positioning elements 23 also facilitate positioning of the components making the assembly of the neck 1 easier.

In the embodiment of FIGS. 1A and 1B, the support bars 30 are formed as I-beams.

The components of the neck 1 are preferably cemented together using epoxy cement to form a rigid neck construction.

The material of the fretboard 20 preferably comprises plastic material compound, which comprises thermoplastic polymer and natural fibers, the natural fibers having a length ranging from 0.5 mm to 5 mm. The natural fibers may be wood-based cellulose, hemp fibers, or flax fibers, for instance. This material selection provides a tone similar to high quality musical string instruments made of wood.

Preferably, the natural fibers of the plastic material compound follow the contours of the fretboard 20 in longitudinal direction of the fretboard 20. This orientation allows the sound to travel in the fretboard 20 faster than the sound would travel if the fibers would be oriented differently. This significantly improves the sound quality of the instrument.

The material of the neck body is preferably wood, or the plastic material compound as described above.

The material of the support bars 30 preferably comprises carbon fiber or glass fiber.

Preferably, the musical instrument is a musical string instrument. Particularly, preferably the musical string instrument is an electric guitar, and the neck 1 is a neck for an electric guitar.

Figure 7:
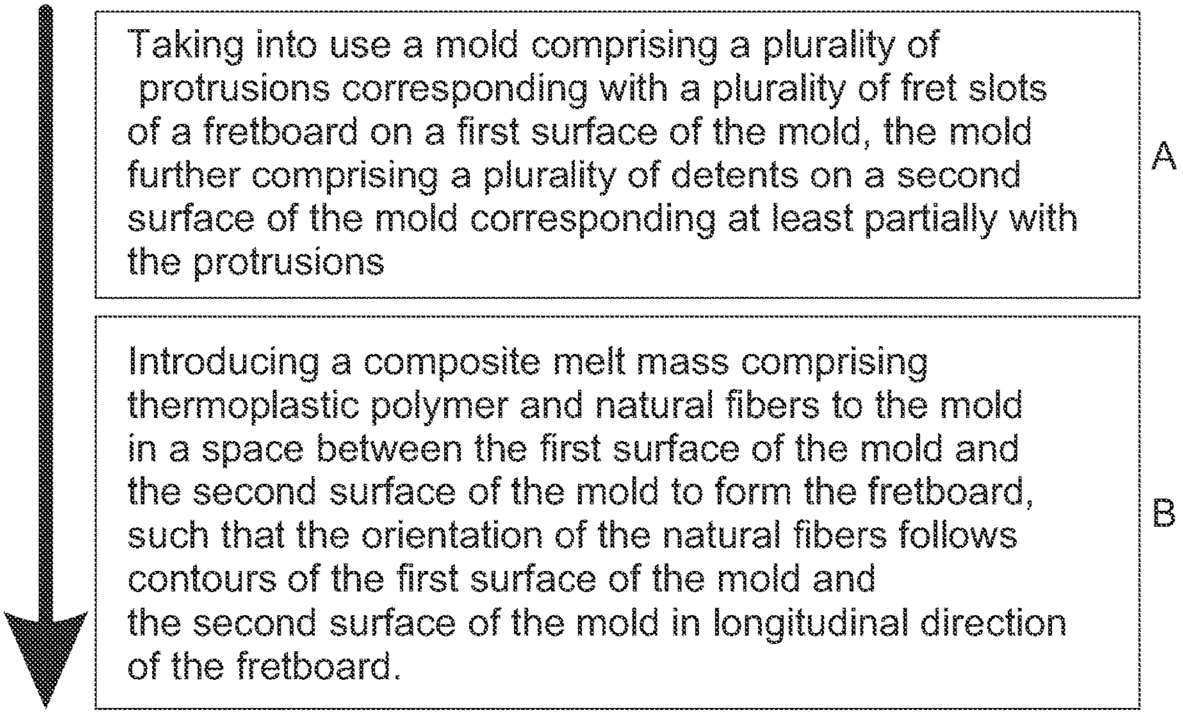
FIG. 7 illustrates a flowchart of an example method for manufacturing a fretboard for a neck of a musical instrument.

FIG. 7 illustrates a flow chart of an embodiment of a manufacturing method for manufacturing a fretboard 20 for a neck 1 of a musical instrument 1. This method may be implemented for manufacturing the fretboards 20 illustrated in FIGS. 1A to 5, for instance. For instance, an injection molding machine can be used for executing the manufacturing steps.

The method comprising: taking into use in step A a mold 50 comprising a plurality of protrusions 51 corresponding with a plurality of fret slots 21 of a fretboard 20 on a first surface 50 of the mold 50, the mold 50 further comprising a plurality of detents 52 on a second surface 50*b* of the mold 50 corresponding at least partially with the protrusions 51; and introducing in step B a composite melt mass comprising thermoplastic polymer and natural fibers to the mold 50 in a space between the first surface 50*a* of the mold 50 and the second surface 50*b* of the mold 50 to form the fretboard 20, such that the orientation of the natural fibers follows contours of the first surface 50*a* of the mold 50 and the second surface 50*b* of the mold 50 in longitudinal direction of the fretboard 20.

The natural fibers following the contours of said surfaces 50*a*, 50*b*, improves strength of the fretboard 20, and improves the sound of the fretboard 20. This also allows a fretboard 20 comprising fret slots 21 and lateral reinforcing tabs 22 to be manufactured, such that the natural fibers of the fretboard 20 are intact. In previously known solutions, the fibers are cut in regions of fret slots, which damages the structural integrity and sound of the fretboard 20.

This method also reduces the throughput time of fretboard 20 manufacturing significantly and increases the accuracy of the manufacturing. The method also improves the working conditions of the manufacturers and improves occupational safety of the manufacturing process.

Figure 6:
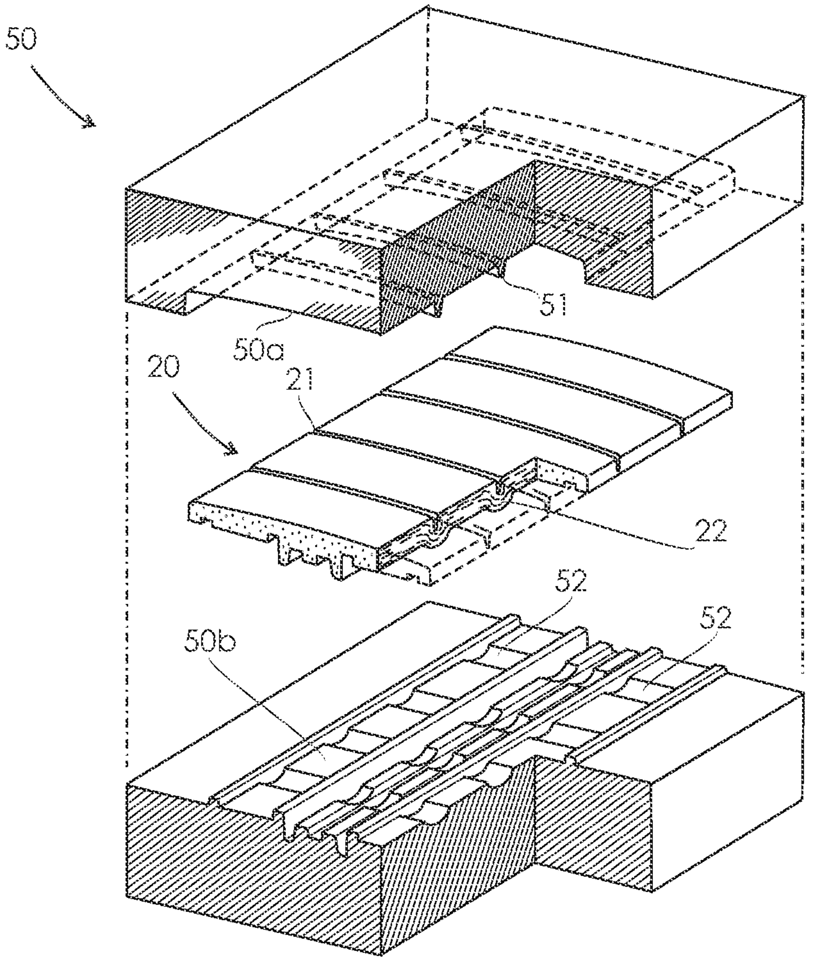
FIG. 6 illustrates an exploded view of a section of an embodiment of a mold for a fretboard.

The steps illustrated in the flow chart require a mold 50 for the fretboard 20. An embodiment of the mold 50 is illustrated in FIG. 6. Once the mold 50 is in position, the mold 50 can be filled with the composite melt mass from one end of the mold 50 to fill the void spaces in the mold 50. Once the mold 50 has been filled, the fretboard 20 is allowed to cure before opening the mold 50 and removing the fretboard 20 from the mold 50.

By injecting the composite melt mass from one end of the mold 50, the fibers of the composite melt mass are aligned in longitudinal direction of the fretboard 20, and the fibers follow the contours of the first surface 50*a* and the second surface 50*b* of the mold 50.

Preferably, the second surface 50*b* of the mold 50 is positioned opposite of the first surface 50*a* of the mold 50, the second surface 50*b* and the first surface 50*a* facing each other.

Preferably, a distance between the first surface 50*a* of the mold 50 and the second surface of the mold 50 in region of each detent 52 is arranged to be at least as great as a distance between the first surface 50*a* of the mold 50 and the second surface 50*b* of the mold 50 outside of said regions. This dimensioning ensures that the properties of the fretboard 20 are as intended, and that the curing of the fretboard 20 is even.

Preferably, the composite melt mass comprises from 20 to 60 weight percent of natural fibers, more preferably from 35 to 55 weight percent of natural fibers. In this range, the flow properties of the composite melt mass are most suitable for manufacturing of the fret board 20.

It is to be understood that the above description and the accompanying figures are only intended to illustrate the present invention. It will be obvious to a person skilled in the art that the invention can be varied and modified without departing from the scope of the invention.

The invention claimed is:

1. A neck for a musical instrument, the neck comprising:
- a neck body,
- a fretboard attached to the neck body, such that the neck body and the fretboard delimit a space, the fretboard comprising a plurality of lateral fret slots on a first side of the fretboard that are oriented to run in a lateral direction of the neck of the musical instrument, and
- elongated support bars arranged between the neck body and the fretboard, the support bars are oriented to run in a longitudinal direction of the neck of the musical instrument that is perpendicular to the lateral direction,
- wherein the fretboard further comprises:
- a plurality of lateral reinforcing tabs on a second side of the fretboard such that each reinforcing tab is located directly between a respective one of the fret slots and the neck body and is oriented to run in the lateral direction of the neck of the musical instrument.

2. The neck according to claim 1, wherein the lateral reinforcing tabs are formed such that a thickness of the fretboard in regions of the lateral reinforcing tabs is at least the thickness of the fretboard outside of said regions.

3. The neck according to claim 1, wherein the fretboard comprises the lateral reinforcing tabs on the second side of the fretboard in regions, that are not directly supported by other structures of the neck.

4. The neck according to claim 1, wherein the elongated support bars are formed as integral parts of the neck body and/or the fretboard.

5. The neck according to claim 1, wherein the elongated support bars are formed as separate parts from the neck body and the fretboard.

6. The neck according to claim 5, wherein the neck body comprises first positioning elements arranged in the longitudinal direction of the neck of the musical instrument, the first positioning elements forming a seat for the elongated support bars in the neck body.

7. The neck according to claim 5, wherein the fretboard comprises second positioning elements on the second side of the fretboard arranged in the longitudinal direction of the fretboard, the second positioning elements forming a seat for the support bars in the fretboard.

8. The neck according to claim 1, wherein the support bars are formed as I-beams.

9. The neck according to claim 1, wherein the support bars comprise carbon fiber or glass fiber.

10. The neck according to claim 1, wherein the fretboard comprises plastic material compound, which comprises thermoplastic polymer and natural fibers, the natural fibers having a length ranging from 0.5 mm to 5 mm.

11. The neck according to claim 1, wherein the musical instrument is an electric guitar.

12. A method for manufacturing a fretboard for a neck of a musical instrument, the method comprising:
- taking into use a mold comprising a plurality of protrusions corresponding with a plurality of fret slots of a fretboard on a first surface of the mold, the mold further comprising a plurality of detents on a second surface of the mold corresponding at least partially with the protrusions; and introducing a composite melt mass comprising thermoplastic polymer and natural fibers to the mold in a space between the first surface of the mold and the second surface of the mold to form the fretboard, such that the orientation of the natural fibers follows contours of the first surface of the mold and the second surface of the mold in longitudinal direction of the fretboard.

13. The method according to claim 12, wherein the second surface of the mold is positioned opposite of the first surface of the mold, the second surface and the first surface facing each other.

14. The method according to claim 12, wherein a distance between the first surface of the mold and the second surface of the mold in region of each detent is arranged to be at least as great as a distance between the first surface of the mold and the second surface of the mold outside of said regions.

15. The method according to claim 12, wherein the composite melt mass comprises from 20 to 60 weight percent of natural fibers, more preferably from 35 to 55 weight percent of natural fibers.

16. The neck according to claim 1, wherein the first side faces away from the neck body and the second side faces the neck body.

17. The neck according to claim 1, wherein each of the plurality of lateral reinforcing tabs is positioned on the second side of the fretboard to reinforce a respective one of the fret slots.

* * * * *